United States Patent
Hirata et al.

(10) Patent No.: US 9,283,739 B2
(45) Date of Patent: *Mar. 15, 2016

(54) METHOD AND SYSTEM FOR CONTINUOUSLY MANUFACTURING OPTICAL DISPLAY PANEL

(71) Applicant: NITTO DENKO CORPORATION, Ibaraki-shi, Osaka (JP)

(72) Inventors: Satoshi Hirata, Ibaraki (JP); Seiji Kondo, Ibaraki (JP); Kazuya Hada, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,477

(22) Filed: Apr. 9, 2013

(65) Prior Publication Data

US 2013/0269869 A1    Oct. 17, 2013

(30) Foreign Application Priority Data

Apr. 16, 2012 (JP) ................................. 2012-093047

(51) Int. Cl.
  *B32B 41/00* (2006.01)
  *B32B 38/10* (2006.01)
(52) U.S. Cl.
  CPC ................ *B32B 38/10* (2013.01); *B32B 41/00* (2013.01); *B32B 2309/14* (2013.01); *B32B 2457/20* (2013.01); *Y10T 156/17* (2015.01)
(58) Field of Classification Search
  CPC .... B32B 38/10; B32B 2309/14; B32B 41/00; G02F 1/1303; Y10T 156/12; Y10T 156/17

USPC .................... 156/64, 230, 350, 351, 378, 379
See application file for complete search history.

(56) References Cited

U.S. PATENT DOCUMENTS 7,022,204 B2    4/2006  Kanbara et al.
8,128,769 B1 *  3/2012  Hada et al. ...................... 156/64
(Continued)

FOREIGN PATENT DOCUMENTS

CN    202156556 U    3/2012
CN    202163626 U    3/2012
(Continued)

OTHER PUBLICATIONS

Notice of Allowance of Korean Application No. 10-2011-4602, mailing date of Apr. 6, 2011 (3 pages).
(Continued)

*Primary Examiner* — Michael N Orlando
*Assistant Examiner* — Joshel Rivera
(74) *Attorney, Agent, or Firm* — Westerman, Hattori, Daniels & Adrian, LLP

(57) ABSTRACT

A method for continuously manufacturing an optical display panel includes a velocity control step includes setting a bonding velocity and a carrier film feed velocity in such a manner that during a period from the start of the bonding of the sheet piece to the end of the bonding, the bonding velocity is higher than the carrier film feed velocity is fed and in such a manner that slack formed in the sheet piece is eliminated between the bonding position and the front end of the peeling unit; and performing control in such a manner that during a period from the start of the bonding to the end of the bonding, the distance (L) is longer than the distance (Ls), while the bonding velocity in the bonding step is higher than the velocity at which the carrier film is fed.

4 Claims, 8 Drawing Sheets

(56) References Cited

U.S. PATENT DOCUMENTS

| 8,485,241 B2* | 7/2013 | Hirata et al. ............ 156/540 |
| 2005/0174526 A1 | 8/2005 | Yu |
| 2006/0185796 A1 | 8/2006 | Hayasaka et al. |
| 2009/0260738 A1 | 10/2009 | Kitada et al. |
| 2009/0301659 A1 | 12/2009 | Nagura |
| 2010/0283943 A1 | 11/2010 | Kimura et al. |
| 2010/0288420 A1 | 11/2010 | Kimura et al. |
| 2010/0316817 A1 | 12/2010 | Kimura et al. |

FOREIGN PATENT DOCUMENTS

| JP | 57-052017 A | 3/1982 |
| JP | 62-153069 A | 7/1987 |
| JP | 10-316108 A | 12/1998 |
| JP | 2002-127258 A | 5/2002 |
| JP | 2004-276579 A | 10/2004 |
| JP | 2004-338408 A | 12/2004 |
| JP | 2004-361741 A | 12/2004 |
| JP | 2010-030744 A | 2/2010 |
| JP | 2011-197651 | 10/2011 |
| KR | 10-2005-0079720 A | 8/2005 |
| TW | 201008726 A | 3/2010 |
| WO | 2009-128207 A1 | 10/2009 |

OTHER PUBLICATIONS

Japanese Office Action dated Dec. 10, 2010, issued in corresponding Japanese Patent Application No. 2010-218238 (4 pages).

Taiwanese Office Action dated Oct. 31, 2011, issued in corresponding Taiwanese Patent Application No. 099137669 (11 pages).

U.S. Notice of Allowance mailing date of Dec. 27, 2011, issued in U.S. Appl. No. 13/081,610 (now U.S. Pat. No. 8,128,769) (7 pages).

U.S Non-Final Office Action dated Sep. 1, 2011, issued in related U.S. Appl. No. 13/081,610 (now U.S. Pat. No. 8,128,769) (17 pages).

Japanese Office Action dated Aug. 25, 2015 issued in counterpart Japanese Patent Application No. 2012-093047, with English translation. (6 pages).

Chinese Search Report issued on Oct. 10, 2015, in counterpart Patent Application No. 201310128117.3 w/English translation (4 pages).

Decision of Refusal dated Dec. 3, 2015, issued in counterpart Japanese Patent Application No. 2012-093047 w/English translation (4 pages).

Chinese Office Action dated Jan. 18, 2016, issued in counterpart Chinese Patent Application No. 201310128117.3, w/English translation (17 pages).

* cited by examiner

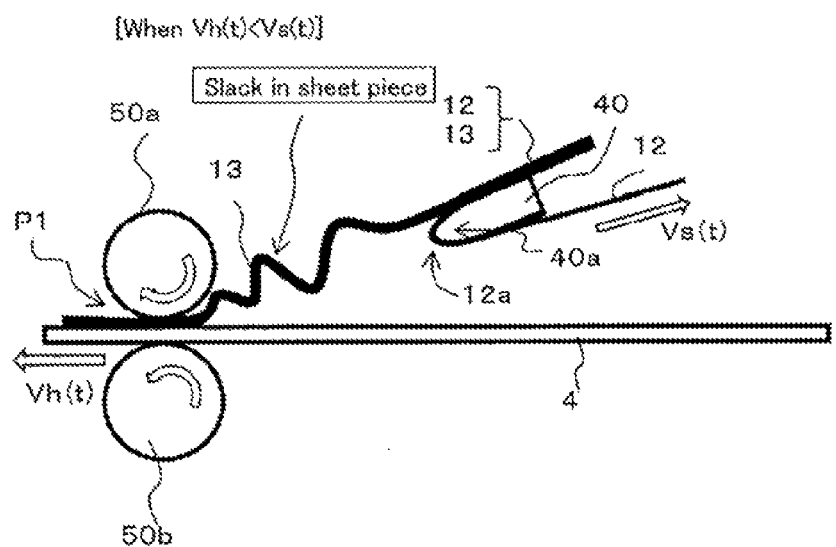
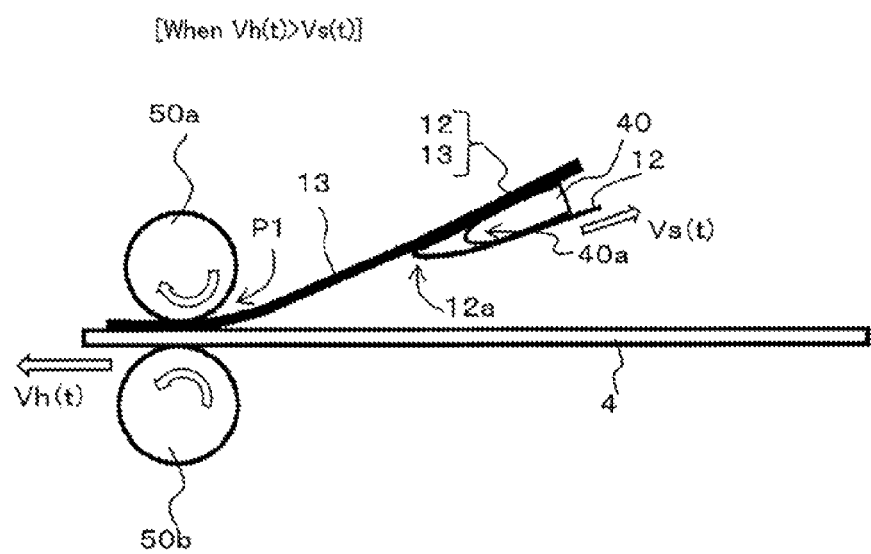

METHOD AND SYSTEM FOR CONTINUOUSLY MANUFACTURING OPTICAL DISPLAY PANEL

BACKGROUND OF THE INVENTION

1. Field of the Invention

The invention relates to a method and a system for continuously manufacturing an optical display panel by a process that includes peeling off a sheet piece of polarizing film from a carrier film and bonding the sheet piece to an optical cell with a pressure-sensitive adhesive interposed therebetween to form an optical display panel.

2. Description of the Related Art

There is a known method that includes providing a carrier film on which sheet pieces of polarizing film are formed with a pressure-sensitive adhesive interposed therebetween, inwardly folding back the carrier film at the front end of peeling means to peel off a sheet piece of the polarizing film together with the pressure-sensitive adhesive from the carrier film, and bonding the sheet piece of the polarizing film, which has been peeled off, to an optical cell with the pressure-sensitive adhesive interposed therebetween (Patent Documents 1).

PRIOR ART DOCUMENTS

Patent Documents

Patent Document 1: JP-A-2004-361741

SUMMARY OF THE INVENTION

As shown in FIG. 7, there is a method that includes nipping a sheet piece 714 of polarizing film and an optical cell 740 between a pair of bonding means (750a, 750b), while peeling off a carrier film 712 from the sheet piece 714 by inwardly folding back the carrier film 712 using peeling means 741, so that the sheet piece 714 is bonded to the optical cell 740. In this method, however, the sheet piece 714 can typically swing during the bonding, so that bonding-induced bubbles can be formed after the sheet piece 714 is bonded to the optical cell 740. Such bubbles can cause image display failure, and thus, some improvements have been needed.

It is an object of the invention, which has been accomplished in view of the above circumstances, to provide a method and a system for continuously manufacturing an optical display panel, which make it possible to suppress swinging of a sheet piece of polarizing film being bonded so that bonding-induced bubbles can be prevented.

As a result of earnest studies to solve the above problems, the invention described below has been accomplished.

An aspect of the invention is directed to a method for continuously manufacturing an optical display panel, including:

a carrier film feeding step including feeding a carrier film by means of a carrier film feeding unit, wherein sheet pieces of polarizing film are formed on the carrier film with a pressure-sensitive adhesive interposed therebetween;

a peeling step including peeling off by means of a peeling unit a sheet piece of the polarizing film together with the pressure-sensitive adhesive from the carrier film by inwardly folding back the carrier film at the front end, wherein the carrier film is fed by the carrier film feeding step;

a take-up step including taking up by means of a take-up unit the carrier film from which the sheet piece is peeled off by the peeling step;

a bonding step including bonding the sheet piece by means of a bonding unit to an optical cell with the pressure-sensitive adhesive interposed therebetween while feeding the optical cell so that an optical display panel is formed, wherein the sheet piece is peeled off from the carrier film by the peeling step; and a velocity control step including: setting a bonding velocity and a carrier film feed velocity in such a manner that during a period from the start of the bonding of the sheet piece to the end of the bonding in the bonding step, the bonding velocity in the bonding step is higher than the carrier film feed velocity at which the carrier film being peeled off in the peeling step is fed by the carrier film feeding unit and in such a manner that slack formed in the sheet piece is eliminated between the bonding position and the front end of the peeling unit; and performing control in such a manner that during a period from the start of the bonding to the end of the bonding, the distance (L) between the bonding position and the front end of the peeling unit is longer than the distance (Ls) between the front end of the peeling unit and a bent part at which the carrier film is folded back, while the bonding velocity in the bonding step is higher than the velocity at which the carrier film is fed by the carrier film feeding unit.

This method can successfully eliminate slack in a sheet piece of the polarizing film peeled off from the carrier film. Thus, this method can suppress swinging of the sheet piece during the bonding and can prevent bonding-induced bubbles.

In the invention, the carrier film feeding unit may include a take-up unit as a part or may not include a take-up unit.

In the invention, the carrier film feeding unit preferably has an upstream-side film supply unit for feeding the carrier film placed upstream of the peeling unit with respect to the feeding or preferably has a downstream-side film supply unit for feeding the carrier film placed downstream of the peeling unit with respect to the feeding. In the velocity control step, the upstream-side film supply unit or the downstream-side film supply unit is preferably driven and controlled to feed the carrier film. The carrier film feeding unit may have both the upstream-side film supply unit and the downstream-side film supply unit, and the velocity control unit may drive and control the upstream-side film supply unit and the downstream-side film supply unit to feed the carrier film.

The upstream-side film supply unit preferably includes feed rollers. The downstream-side film supply unit also preferably includes feed rollers.

Another aspect of the invention is directed to a system for continuously manufacturing an optical display panel, including:

a carrier film feeding unit for feeding a carrier film on which sheet pieces of polarizing film are formed with a pressure-sensitive adhesive interposed therebetween;

a peeling unit for peeling off a sheet piece of the polarizing film together with the pressure-sensitive adhesive from the carrier film by inwardly folding back the carrier film at its front end, wherein the carrier film is fed by the carrier film feeding unit;

a take-up unit for taking up the carrier film from which the sheet piece is peeled off by the peeling unit;

a bonding unit for bonding the sheet piece, which is peeled off from the carrier film by the peeling unit, to an optical cell with the pressure-sensitive adhesive interposed therebetween while feeding the optical cell so that an optical display panel is formed; and a velocity control unit for setting a bonding velocity and a carrier film feed velocity in such a manner that during a period from the start of the process of bonding the sheet piece by means of the bonding unit to the end of the bonding, the bonding velocity in the bonding process is higher than the carrier film feed velocity at which the carrier film being peeled off by the peeling unit is fed by the carrier film feeding unit and in such a manner that slack formed in the sheet piece being subjected to the bonding is eliminated between the front end of the peeling unit and a position in which the bonding is performed by the bonding unit, the velocity control unit being also for performing control in such a manner that during a period from the start of the bonding process to the end of the bonding, the distance (L) between the front end of the peeling unit and the position in which the bonding is performed by the bonding unit is longer than the distance (Ls) between the front end of the peeling unit and a bent part at which the carrier film is folded back, while the bonding velocity of the bonding unit is higher than the velocity at which the carrier film is fed by the carrier film feeding unit.

This system can successfully eliminate slack in a sheet piece of the polarizing film peeled off from the carrier film. Thus, this system can suppress swinging of the sheet piece during the bonding and can prevent bonding-induced bubbles. In this aspect of the invention, the carrier film feeding unit and the take-up unit are different elements.

In the invention, the carrier film feeding unit preferably has an upstream-side film supply unit for feeding the carrier film placed upstream of the peeling unit with respect to the feeding or preferably has a downstream-side film supply unit for feeding the carrier film placed downstream of the peeling unit with respect to the feeding. The velocity control unit preferably drives and controls the upstream-side film supply unit or the downstream-side film supply unit to feed the carrier film. The carrier film feeding unit may have both the upstream-side film supply unit and the downstream-side film supply unit, and the velocity control unit may drive and control the upstream-side film supply unit and the downstream-side film supply unit to feed the carrier film.

The upstream-side film supply unit preferably includes feed rollers. The downstream-side film supply unit also preferably includes feed rollers.

In the system, for example, the upstream-side film supply unit has feed rollers including a first roller and a second roller opposed to the first roller, and the first and second rollers hold the carrier film (typically, the carrier film on which sheet pieces are formed) therebetween and rotate to feed the carrier film. One of the first and second rollers may be a drive roller, or both may be drive rollers.

In the system, for example, the downstream-side film supply unit has feed rollers including a first roller and a second roller opposed to the first roller, and the first and second rollers hold the carrier film (typically, the carrier film from which a sheet piece has been peeled off) therebetween and rotate to feed the carrier film. One of the first and second rollers may be a drive roller, or both may be drive rollers.

In a preferred mode of the invention, the bonding unit has a bonding roller for pressing the sheet piece against the surface of the optical cell; and a backing roller opposed to the bonding roller, in which the bonding roller and the backing roller hold the sheet piece and the optical cell therebetween to bond the sheet piece to the surface of the optical cell while feeding the sheet piece and the optical cell, and the velocity control unit drives and controls the bonding roller and/or the backing roller.

The bonding velocity is a traveling velocity per unit time at which the sheet piece peeled off from the carrier film is fed to the bonding position and bonded to the optical cell. For example, the bonding velocity corresponds to the velocity of travel (feed) of the sheet piece and the optical cell in the process of bonding the sheet piece to the optical cell by means of the bonding roller and the backing roller. The carrier film feed velocity is a traveling velocity per unit time at which the carrier film is fed by the carrier film feeding unit.

It is considered that the method and the system of the invention for continuously manufacturing an optical display panel work as described below. The front end part of a sheet piece of polarizing film being fed to the bonding position in the bonding unit can be unstable and easily slacken because it has been peeled off from the carrier film. Thus, immediately after the start of the bonding, slack can easily occur to cause the sheet piece to easily swing during the bonding, which can cause bonding-induced bubbles. Also, even when there is no slack, a carrier film feed velocity higher than the bonding velocity can cause slack. Thus, this risk should be avoided. FIGS. 1A and 1B show a mechanism for the occurrence of slack in cases where there is a difference between the bonding velocity and the carrier film feed velocity. FIG. 1A shows a case where the feed velocity Vs(t) of the carrier film 12 is higher than the bonding velocity Vh(t), in which a sheet piece 13 of polarizing film tends to slacken and swing between the bonding position P1 and the front end 40a of a peeling unit 40. In FIG. 1A, a bent part 12a at which the carrier film 12 is folded back is formed along the periphery of the front end 40a of the peeling unit 40. On the other hand, FIG. 1B shows a case where the bonding velocity Vh(t) is higher than the carrier film feed velocity Vs(t), in which a bent part 12a at which the carrier film 12 is folded back is formed to protrude from the front end 40a of the peeling unit 40 so that the carrier film 12 is separated from the peeling unit 40. In this case, the sheet piece 13 can be bonded without slackening or swinging.

In the invention, the velocity control unit controls the carrier film feed velocity (the feed velocity of the carrier film feeding unit) and the bonding velocity of the bonding unit, respectively, in such a manner that the bonding velocity (Vh(t)) is higher than the carrier film feed velocity (Vs(t)) so that slack formed in the sheet piece at the initial stage of the bonding can be eliminated and in such a manner that the bonding velocity (Vh(t)) and the carrier film feed velocity (Vs(t)) are set so that slack formed in the sheet piece can be eliminated between the bonding position in the bonding unit and the front end of the peeling unit, which makes it possible to avoid the risk of the occurrence of slack in the sheet piece during the bonding.

In the invention, the following condition is satisfied. During a period from the start of the bonding process to the end of the bonding, the bonding velocity (Vh(t)) in the bonding process is higher than the carrier film feed velocity (Vs(t)) at which the carrier film is peeled off in the peeling step (Vh(t)>Vs(t)), and the bonding velocity (Vh(t)) and the strip-shaped carrier film feed velocity (Vs(t)) are set so that slack formed in the sheet piece can be eliminated between the bonding position and the front end of the peeling unit. This condition can be expressed by conditional expression (1) below.

$$\int_0^t Vh(t)dt - \int_0^t Vs(t)dt = Lf - L, \qquad \text{<Conditional Expression (1)>}$$

provided that t satisfying conditional expression (1) falls within the range 0<t<T.

In conditional expression (1), L represents the distance [mm] in a straight line between the bonding position P1 and the front end 40a of the peeling unit 40, t time [second], Vh(t) the bonding velocity [mm/second], Vs(t) the carrier film feed velocity [mm/second], and T the bonding time (period) [second]. Lf represents the actual length of a sheet piece of polarizing film between the bonding position P1 and the front end

40*a* of the peeling unit 40. The length Lf can be calculated through the analysis of the image taken with a video.

FIG. 2A is a diagram for illustrating conditional expression (1). The left-hand side of conditional expression (1) represents the amount of slack eliminated by the velocity difference between the bonding velocity Vh(t) and the carrier film feed velocity Vs(t). The right-hand side of conditional expression (1) represents the amount of actual slack in a sheet piece of polarizing film. It is necessary to eliminate slack during a period from the start of the bonding to the end of the bonding. Thus, t satisfying conditional expression (1) has to fall within the range 0<t<T. For example, t/T is preferably 0.3 or less, wherein T represents the time (period) from the start of the bonding to the end of the bonding, and t represents a time at which slack is eliminated. The value t/T, which should be 0.3 or less, can be determined by a process that includes performing the bonding process twice or more, while measuring the time (t) at which slack is eliminated from the sheet piece of polarizing film during the period T, and averaging the measurements.

As the rigidity against bending (bending rigidity) of the optical film decreases, the sheet piece of polarizing film becomes more likely to slack, and bubbles become more likely to occur in the boding of the sheet piece to the optical cell. In the invention, the use of a polarizing film having a bending rigidity per unit width of 5 N·mm²/mm or less is particularly preferred. The bending rigidity per unit width (E×I) indicates a degree of resistance to bending of the material. E represents the modulus [N/mm²] of longitudinal elasticity of the polarizing film, I represents the second moment of area per unit width, and I=b×h³/12, wherein b represents the unit width [1 mm], and h represents the thickness [mm] of the polarizing film.

As shown in FIG. 2A, the velocity control unit according to the invention further performs control in such a manner that the distance (L) between the bonding position P1 in the bonding unit (50*a*, 50*b*) and the front end 40*a* of the peeling unit 40 is longer than the distance (Ls) between the front end 40*a* of the peeling unit 40 and a bent part 12*a* at which the carrier film 12 is folded back, while the bonding velocity of the bonding unit is higher than the velocity at which the carrier film is fed by the carrier film feeding unit, so that the bent part 12*a* of the carrier film 12 is prevented from being entangled with the bonding unit (50*a*, 50*b*).

In the invention, the following condition is also satisfied. The distance (L) between the bonding position in the bonding means and the front end of the peeling unit is longer than the distance (Ls) between the front end of the peeling unit and a bent part at which the carrier film is folded back. This condition can be expressed by conditional expression (2) below.

$$2\times L > \int_0^T [Vh(t)-Vs(t)]dt \qquad \text{<Conditional Expression (2)>}$$

In conditional expression (2), L represents the distance [mm] in a straight line between the bonding position P1 and the front end 40*a* of the peeling unit 40, t time [second], Vh(t) the bonding velocity [mm/second], Vs(t) the carrier film feed velocity [mm/second], and T the bonding time (period) [second].

When conditional expression (2) is satisfied, the carrier film separating from the peeling unit under the condition Vh(t)>Vs(t) can be prevented from being entangled with the bonding unit.

When conditional expressions (1) and (2) are satisfied, sheet piece of polarizing film is prevented from slackening or swinging during the bonding, and the carrier film is prevented from being entangled with the bonding unit.

BRIEF DESCRIPTION OF THE DRAWINGS

FIG. 1A is a diagram for illustrating slack in a sheet piece of polarizing film being bonded;

FIG. 1B is a diagram for illustrating slack in a carrier film during bonding;

DETAILED DESCRIPTION OF THE PREFERRED EMBODIMENTS (Polarizing Film and Continuous Roll)

In an embodiment of the invention, the polarizing film may be formed in any mode on the carrier film. For example, they may be wound to form a continuous roll. For example, the continuous roll may be (1) a roll of an optical film laminate including a carrier film and a polarizing film formed on the carrier film with a pressure-sensitive adhesive interposed therebetween. In this case, the system for continuously manufacturing an optical display panel has cutting means for cutting the polarizing film into sheet pieces of the polarizing film in such a manner that the polarizing film and the pressure-sensitive adhesive are cut at predetermined intervals while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of polarizing film formed on the carrier film with a pressure-sensitive adhesive interposed therebetween (what is called a continuous roll of a scored polarizing film).

Figure 2A:
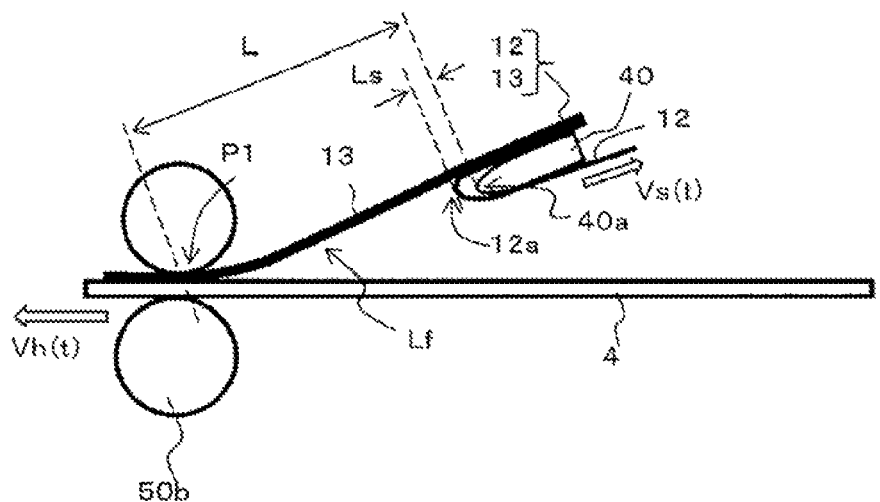
FIG. 2A is a diagram for illustrating conditional expressions (1) and (2)
Figure 2B:
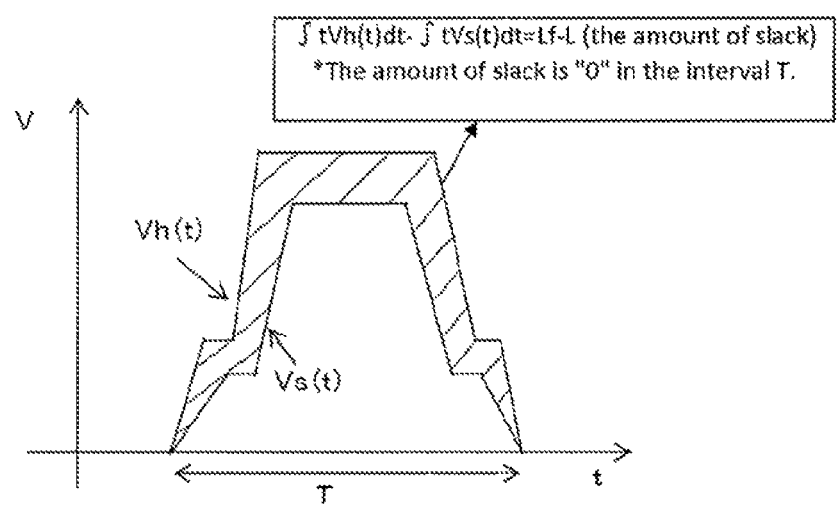
FIG. 2B is a diagram for illustrating conditional expression (1)
Figure 3:
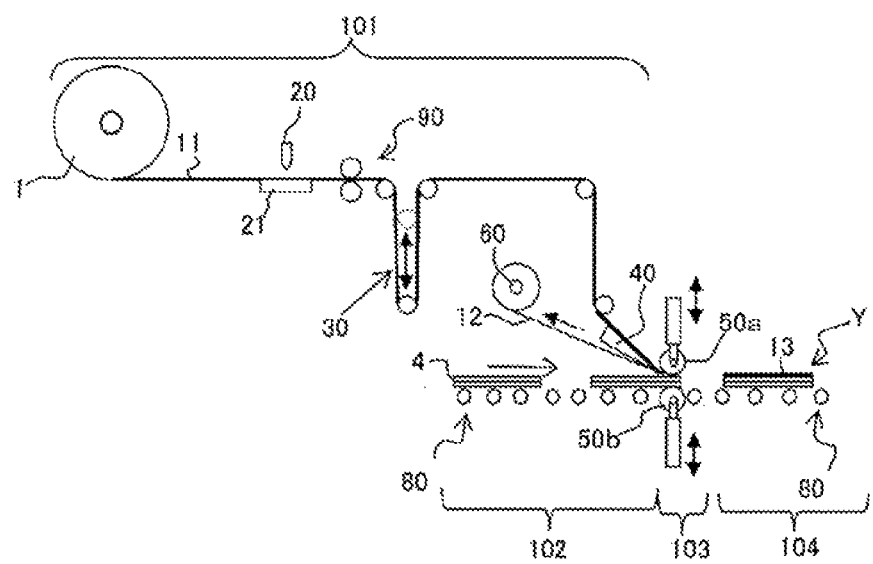
FIG. 3 is a schematic diagram showing an example of the system for continuously manufacturing an optical display panel.

As shown in FIG. 3, for example, the first continuous roll 1 is a roll of a first optical film laminate 11 including a first carrier film 12 and a first polarizing film 13 formed on the first carrier film 12 with a first pressure-sensitive adhesive interposed therebetween.

For example, the polarizing film includes a polarizer (about 1.5 to about 80 μm in thickness) and a polarizer protecting film or films (generally about 1 to about 500 μm in thickness) formed on one or both sides of the polarizer with or without an adhesive. The first optical film laminate 11 may further include any other film such as a retardation film (generally 10 to 200 μm in thickness), a viewing angle compensation film, a brightness enhancement film, or a surface protecting film. The thickness of the optical film laminate is typically in the range of 10 μm to 500 μm. The pressure-sensitive adhesive interposed between the polarizing film and the carrier film may be of any type such as an acryl-based pressure-sensitive adhesive, a silicone pressure-sensitive adhesive, or a urethane pressure-sensitive adhesive. For example, the thickness of the pressure-sensitive adhesive layer is preferably in the range of 10 to 50 μm. The peel strength between the pressure-sensitive adhesive and the carrier film is typically, but not limited to, 0.15 (N/50 mm sample width). The peel strength can be measured according to JIS Z 0237.

For example, the carrier film to be used may be a known conventional film such as a plastic film (e.g., a polyethylene terephthalate film or a polyolefin film). According to conventional techniques, any appropriate film such as a film coated with an appropriate release agent such as a silicone, long-chain alkyl, or fluoride release agent, or molybdenum sulfide may also be used as needed.

The optical display panel includes an optical cell and a sheet piece or pieces of polarizing film provided on one or both sides of the optical cell, into which a driving circuit is incorporated as needed. For example, the optical cell may be a liquid crystal cell or an organic EL cell. Any type of liquid crystal cell may be used, such as a vertical alignment (VA) or in-plane switching (IPS) type liquid crystal cell. The optical cell 4 shown in FIG. 3 is a liquid crystal cell including a pair of substrates (first and second substrates 41 and 42) opposed to each other and a liquid crystal layer sealed in between the substrates.

(First Embodiment)

The system according to this embodiment for continuously manufacturing an optical display panel includes a carrier film feeding unit for feeding a carrier film on which sheet pieces of polarizing film are formed with a pressure-sensitive adhesive interposed therebetween; a peeling unit for peeling off a sheet piece of the polarizing film together with the pressure-sensitive adhesive from the carrier film by inwardly folding back the carrier film at its front end, wherein the carrier film is fed by the carrier film feeding unit; a take-up unit for taking up the carrier film from which the sheet piece is peeled off by the peeling unit; a bonding unit for bonding the sheet piece, which is peeled off from the carrier film by the peeling unit, to an optical cell with the pressure-sensitive adhesive interposed therebetween while feeding the optical cell so that an optical display panel is formed; and a velocity control unit for controlling the feed velocity of the take-up unit and the feed velocity of the bonding unit.

The velocity control unit sets the bonding velocity and the carrier film feed velocity in such a manner that during a period from the start of the process of bonding the sheet piece by means of the bonding unit to the end of the bonding, the bonding velocity in the bonding process is higher than the carrier film feed velocity at which the carrier film is fed by the carrier film feeding unit and in such a manner that slack formed in the sheet piece being subjected to the bonding is eliminated between the front end of the peeling unit and the position in which the bonding is performed by the bonding unit. The velocity control unit also performs control in such a manner that during a period from the start of the bonding process to the end of the bonding, the distance (L) between the front end of the peeling unit and the position in which the bonding is performed by the bonding unit is longer than the distance (Ls) between the front end of the peeling unit and a bent part at which the carrier film is folded back, while the bonding velocity of the bonding unit is higher than the velocity at which the carrier film is fed by the carrier film feeding unit. Hereinafter, the system and method according to this embodiment for continuously manufacturing an optical display panel are more specifically described with reference to FIGS. 3 to 5. It will be understood that this embodiment is not intended to limit the invention.

The system for continuously manufacturing an optical display panel includes a first carrier film feeding unit 101, a first optical cell feeding unit 102, a first bonding unit 103 (including a first bonding roller 50a and a first drive roller 50b), a second optical cell feeding unit 104, a second carrier film feeding unit, a second bonding unit (including a second bonding roller and a second drive roller), and an optical display panel feeding unit. In this embodiment, a sheet piece of polarizing film is bonded to an optical cell from the upper side, and then after the optical cell with the sheet piece bonded thereto is turned over (front side back and optionally turned by 90°), another sheet piece of polarizing film is bonded to the optical cell from the upper side. Alternatively, a sheet piece of polarizing film may be bonded to the optical cell from the lower side, and then after the optical cell is turned over, another sheet piece may be bonded to the optical cell from the lower side. Alternatively, after a sheet piece is bonded to the optical cell from the upper side, another sheet piece may be bonded to the optical cell from the lower side without turning over the optical cell, or after a sheet piece is bonded to the optical cell from the lower side, another sheet piece may be bonded to the optical cell from the upper side without turning over the optical cell.

(First Optical Cell Feeding Unit)

The first optical cell feeding unit 102 feeds the optical cell 4 to the first bonding unit 103. In this embodiment, the first optical cell feeding unit 102 includes feed rollers 80, a suction plate, and other components. The optical cell 4 is fed to the downstream side of the manufacturing line by rotating the feed rollers 80 or shifting the suction plate. In the process of bonding a first sheet piece 13, the first optical cell feeding unit 102 is controlled by the first velocity control unit 110 described below when it feeds the optical cell 4 to the bonding position in the bonding unit.

(First Carrier Film Feeding Unit)

The first carrier film feeding unit 101 draws the first optical film laminate 11 from the first continuous roll 1, cuts the first polarizing film and the pressure-sensitive adhesive at predetermined intervals to form a sheet piece 13 (first sheet piece) of the first polarizing film on the first carrier film 12, peels off the first sheet piece 13 and the pressure-sensitive adhesive from the first carrier film 12 by inwardly folding back the first carrier film 12 at the front end of a first peeling unit 40, and feeds the first sheet piece 13 and the pressure-sensitive adhesive to the first bonding unit 103. For this process, the first carrier film feeding unit 101 includes a first cutting unit 20, a first dancer roller 30, a first peeling unit 40, an upstream-side film supply unit 90, and a first take-up unit 60.

The first cutting unit 20 holds the first optical film laminate 11 with a suction unit 21 from the first carrier film 12 side and cuts the first polarizing film and the pressure-sensitive adhesive to form the first sheet piece 13 on the first carrier film 12. For example, the first cutting unit 20 may be a cutter, a laser, or the like.

The first dancer roller 30 has the function of maintaining tension on the first carrier film 12. The first dancer roller 30 is placed between the first peeling unit 40 and the upstream-side film supply unit 90 described below. After the first sheet piece 13 being bonded is detached (completely separated) from the first carrier film 12, the first dancer roller 30 automatically returns the first carrier film 12 to the upstream side from the position in which it protrudes from the front end (peeling point) of the first peeling unit 40 (so that the length Ls of the protrusion of the first carrier film 12 is reduced or eliminated).

The upstream-side film supply unit 90 has feed rollers including a first roller 90a driven and rotated by a motor (not shown) and a second roller 90b that is opposed to the first roller 90a and pushed to the first roller 90a by biasing means (such as a compression spring or a leaf spring, not shown). The upstream-side film supply unit 90 is placed upstream of the first peeling unit 40 with respect to the feeding (see FIG. 4A). The first carrier film 12 (with the sheet piece 13 formed thereon) is held between the first and second rollers 90a and 90b. The rotation of the first roller 90a is followed by the rotation of the second roller 90b, and they feed the first carrier film 12 to the first peeling unit 40 on the downstream side. In the process of bonding the first sheet piece 13, the feed velocity Vs(t) at which the first carrier film 12 is fed by the upstream-side film supply unit 90 is controlled by the first velocity control unit 110 described below.

Examples of materials that may be used for the first and second rollers 90a and 90b of the upstream-side film supply unit 90 (feed rollers) include metal, rubber, and resin. Any of these materials may be used to form the whole of each roller or used to form at least the outer surface of each roller.

Alternatively, the upstream-side film supply unit 90 may include a suction roller in place of the feed rollers, in which the suction roller sucks and feeds the first carrier film 12.

In the process of bonding the first sheet piece 13 to the optical cell 4, the first peeling unit 40 inwardly folds back the first carrier film 12 at its front end to peel off the first sheet piece 13 and the pressure-sensitive adhesive from the first carrier film 12. In this embodiment, a sharp knife edge is used as a non-limiting example of the front end of the first peeling unit 40.

The first take-up unit 60 takes up the first carrier film 12 from which the first sheet piece 13 and the pressure-sensitive adhesive have been peeled off. In the process of bonding the first sheet piece 13, the first take-up unit 60 is controlled by the first velocity control unit 110 described below.

(First Bonding Unit)

The first bonding unit 103 bonds the first sheet piece 13, which is fed by the first carrier film feeding unit 101, to the optical cell 4 from the upper side with the pressure-sensitive adhesive interposed therebetween, when the optical cell 4 is fed by the first optical cell feeding unit 102. In this embodiment, the first bonding unit 103 includes a first bonding roller 50a and a first drive roller 50b (corresponding to a backing roller). The drive roller 50b is driven and rotated by a motor (not shown). In the process of bonding the first sheet piece 13, the rotational velocity of the first drive roller 50b, which corresponds to the bonding velocity Vh(t), is controlled by the velocity control unit 110 described below. It has a mechanism in which the first bonding roller 50a is driven by the rotation of the first drive roller 50b. Such a mechanism is non-limiting, and alternatively, the relationship between the driver and the follower may be reversed in the mechanism, or both may be drive mechanisms.

(First Velocity Control Unit)

The first velocity control unit 110 controls the rotational velocity of the upstream-side film supply unit 90 (the first roller 90a as a driver) and the rotational velocity of the first drive roller 50b, respectively. In the process of bonding the first sheet piece 13, the first velocity control unit 110 also controls the velocity of feed of the first carrier film 12 and the bonding velocity at which the sheet piece 13 is bonded to the optical cell 4. The first velocity control unit 110 also controls the take-up velocity of the first tack-up unit 60.

The first velocity control unit 110 sets the bonding velocity (Vh(t)) and the carrier film feed velocity (Vs(t)) so as to satisfy the following first condition: the bonding velocity (Vh(t)) is higher than the carrier film feed velocity (Vs(t)) (Vh(t)>Vs(t)); and slack formed in the sheet piece 13 is eliminated between the bonding position P1 and the front end 40a of the peeling unit 40. The first velocity control unit 110 also performs control so as to satisfy the following second condition: the distance (L) between the bonding position P1 in the first bonding unit 103 (the first bonding roller 50a and the first drive roller 50b) and the front end 40a of the first peeling unit 40 is longer than the distance (Ls) between the front end 40a of the first peeling unit 40 and a bent part 12a at which the carrier film 12 is folded back; and the bonding velocity (Vh(t)) of the first bonding unit 103 (the first bonding roller 50a and the first drive roller 501) is higher than the carrier film feed velocity (Vs(t)) of the upstream-side film supply unit 90 (see FIGS. 4A and 5).

To satisfy the relation L>Ls, the first velocity control unit 110 controls the rotational velocity of the first roller 90a as a driver in the upstream-side film supply unit 90, and also controls the rotational velocity of the take-up roller 60a (drive roller) in the first take-up unit 60, namely, the velocity of take-up of the first carrier film 12. The first velocity control unit 110 controls the first roller 90a and the take-up roller 60a in such a manner that the carrier film feed velocity of the upstream-side film supply unit 90 is higher than the carrier film take-up velocity of the first take-up unit 60.

The first velocity control unit 110 may include dedicated devices or dedicated circuits, may include a computer in cooperation with software programs for conducting the respective control procedures, or may include firmware.

(Second Optical Cell Feeding Unit)

The second optical cell feeding unit 104 feeds, to the second bonding unit, the optical cell 4 with the first sheet piece 13 bonded thereto by the first bonding unit 103. The second optical cell feeding unit 104 includes a turning mechanism (not shown) for horizontally turning by 90° the optical cell 4 with the first sheet piece 13 bonded thereto and a turn-over mechanism for turning over the optical cell 4 with the first sheet piece 13 bonded thereto.

Any of various means and apparatuses as described above may be used to bond another sheet piece of the polarizing film to the other side of the optical cell 4. The second carrier film feeding unit may have the same configuration as the first carrier film feeding unit, and the second bonding unit may have the same configuration as the first bonding unit. For example, the second dancer roller may have the same configuration as the first dancer roller 30, the second take-up unit may have the same configuration as the first take-up unit 60, and the second bonding roller and the second drive roller may have the same mechanism as the first bonding roller 50a and the first drive roller 50b. The second velocity control unit may also have the same function as the first velocity control unit 110.

The optical display panel feeding unit (not shown) may include feed rollers or a suction plate and other components for feeding downstream the optical display panel Y formed by the second bonding unit. An inspection apparatus for inspecting the optical display panel Y may also be provided downstream with respect to the feeding. The purpose and method of the inspection using the inspection apparatus are not restricted.

(Continuous Manufacturing Method)

The optical display panel manufacturing method according to this embodiment includes a carrier film feeding step including feeding a carrier film by means of a carrier film feeding unit, wherein sheet pieces of polarizing film are formed on the carrier film with a pressure-sensitive adhesive interposed therebetween; a peeling step including peeling off a sheet piece of the polarizing film together with the pressure-sensitive adhesive from the carrier film by inwardly folding back the carrier film at the front end, wherein the carrier film is fed by the carrier film feeding step; a take-up step including taking up the carrier film from which the sheet piece is peeled off by the peeling step; a bonding step including bonding the sheet piece by means of a bonding unit to an optical cell with the pressure-sensitive adhesive interposed therebetween while feeding the optical cell so that an optical display panel is formed, wherein the sheet piece is peeled off from the carrier film by the peeling step; and a velocity control step including: setting the bonding velocity and the carrier film feed velocity in such a manner that during a period from the start of the bonding of the sheet piece to the end of the bonding in the bonding step, the bonding velocity in the bonding step is higher than the carrier film feed velocity at which the carrier film being peeled off in the peeling step is fed by the carrier film feeding unit and in such a manner that slack formed in the sheet piece can be eliminated between the bonding position and the front end of the peeling unit; and performing control in such a manner that during a period from the start of the bonding to the end of the bonding, the distance (L) between the bonding position and the front end of the peeling unit is longer than the distance (Ls) between the front end of the peeling unit and a bent part at which the carrier film is folded back, while the bonding velocity in the bonding step is higher than the velocity at which the carrier film is fed by the carrier film feeding unit.

(First Bonding Step)

The first bonding step includes bonding a first sheet piece of the first polarizing film, which is drawn and fed from the first continuous roll, to a first substrate of the optical cell. In this embodiment, the first optical film laminate 11 is drawn from the first continuous roll 1, which is a roll of the first optical film laminate 11 including the first carrier film 12 and the first polarizing film formed on the first carrier film 12. The first polarizing film and the pressure-sensitive adhesive are then cut while the first carrier film 12 is left (uncut), so that a first sheet piece 13 of the first polarizing film is formed on the first carrier film 12. The first carrier film 12 is then inwardly folded back at the front end of the first peeling unit 40 and fed so that the first sheet piece 13 and the pressure-sensitive adhesive are peeled off from the first carrier film 12. The first sheet piece 13 peeled off from the first carrier film 12 is then bonded to a first substrate of the optical cell 4 with the pressure-sensitive adhesive interposed therebetween.

(First Velocity Control Step)

The first velocity control step includes setting the bonding velocity (Vh(t)) and the feed velocity (Vs(t)) of the first carrier film 12 in such a manner that during a period from the start of the bonding of the first sheet piece 13 to the end of the bonding in the bonding step, the bonding velocity (Vh(t)) in the bonding step is higher than the feed velocity (Vs(t)) of the first carrier film 12 at which the first carrier film 12 being peeled off in the peeling step is fed by the carrier film feeding unit (Vh(t)>Vs(t)) and in such a manner that slack formed in the first sheet piece 13 is eliminated between the bonding position and the front end 40a of the peeling unit 40; and performing control in such a manner that during a period from the start of the bonding to the end of the bonding, the distance (L) between the bonding position and the front end 40a of the peeling unit 40 is longer than the distance (Ls) between the front end 40a of the peeling unit 40 and a bent part 12a at which the first carrier film 12 is folded back, while the bonding velocity in the bonding step is higher than the velocity at which the carrier film is fed by the carrier film feeding unit.

In the continuous manufacturing method, the carrier film feeding step includes the step of feeding the carrier film in such a manner that tension on the carrier film can be maintained. In this embodiment, the first dancer roller 30 is used to maintain tension on the first carrier film 12.

When the polarizing film is also bonded to the other substrate of the optical cell 4, the method should further include a turning step including rotating and turning over the optical cell. The turning step includes horizontally turning by 90° the optical cell 4 with the first polarizing film 14 bonded thereto and turning over the optical cell 4. Alternatively, the turning step may include turning over the optical cell about a single axis neither parallel to the long side nor to the short side of the optical cell so that the positional relationship between the long and short sides of the optical cell can be reversed. The step of bonding a sheet piece of the second polarizing film may be performed in the same manner as the first bonding step, and the second velocity control step may also be performed in the same manner as the first velocity control step.

(Second Embodiment)

The features of Second Embodiment different from First Embodiment will be described. In Second Embodiment, the first carrier film feeding unit 101 has a downstream-side film supply unit 95 in place of the upstream-side film supply unit 90.

The downstream-side film supply unit 95 has feed rollers including a first roller 95a driven by a motor (not shown) and a second roller 95b that is opposed to the first roller 95a and pushed to the first roller 95a by biasing means (such as a compression spring or a leaf spring, not shown). The downstream-side film supply unit 95 is placed downstream of the first peeling unit 40 with respect to the feeding and upstream of the first take-up unit 60 with respect to the feeding (see FIG. 4B). The first carrier film 12 (obtained after the sheet piece 13 is peeled off) is held between the first and second rollers 95a and 95b. The rotation of the first roller 95a is followed by the rotation of the second roller 95b, and they feed the first carrier film 12 to the take-up unit 60 downstream with respect to the feeding. In the process of bonding the first sheet piece 13, the feed velocity Vs(t) at which the first carrier film 12 is fed by the downstream-side film supply unit 95 is controlled by the first velocity control unit 110 in the same manner as described above.

The first velocity control unit 110 controls the rotational velocity of the downstream-side film supply unit 95 (the first roller 95a as a driver) and the rotational velocity of the first drive roller 50b, respectively. In the process of bonding the first sheet piece 13, the first velocity control unit 110 also controls the velocity of feed of the first carrier film 12 and the bonding velocity at which the sheet piece 13 is bonded to the optical cell 4.

The first velocity control unit 110 sets the bonding velocity (Vh(t)) and the carrier film feed velocity (Vs(t)) so as to satisfy the following first condition: the bonding velocity (Vh(t)) is higher than the carrier film feed velocity (Vs(t))

(Vh(t)>Vs(t)); and slack formed in the first sheet piece 13 is eliminated between the bonding position P1 and the front end 40a of the peeling unit 40. The first velocity control unit 110 also performs control so as to satisfy the following second condition: the distance (L) between the bonding position P1 in the first bonding unit 103 (the first bonding roller 50a and the first drive roller 50b) and the front end 40a of the first peeling unit 40 is longer than the distance (Ls) between the front end 40a of the first peeling unit 40 and a bent part 12a at which the carrier film 12 is folded back; and the bonding velocity (Vh(t)) of the first bonding unit 103 (the first bonding roller 50a and the first drive roller 501) is higher than the velocity (Vs(t)) at which the carrier film is fed by the downstream-side film supply unit 95 (see FIGS. 4B and 5).

(Third Embodiment)

In Third Embodiment, the system has both of the upstream-side film supply unit 90 according to First Embodiment and the downstream-side film supply unit 95 according to Second Embodiment. The carrier film feed velocity (Vs(t)) is controlled using both the upstream-side film supply unit 90 and the downstream-side film supply unit 95. When the film supply units (feed rollers) are placed both upstream and downstream (upstream and downstream relative to the first peeling unit 40), tension can be applied to the carrier film being fed. For example, the downstream-side supply velocity (feed velocity) may be made higher than the upstream-side supply velocity, so that tension can be applied to the carrier film between the downstream and upstream sides.

(Fourth Embodiment)

In Fourth Embodiment, the system uses the first take-up unit 60 and the upstream-side film supply unit 90 according to First Embodiment to feed the first carrier film 12 (the first optical film laminate 11). The carrier film feed velocity (Vs(t)) is controlled using both the first take-up unit 60 and the upstream-side film supply unit 90. In this system, the film supply unit (feed rollers) is placed upstream of the first peeling unit 40 with respect to the feeding, and the film take-up unit is placed downstream of the first peeling unit 40 with respect to the feeding, so that tension can be applied to the carrier film being fed.

(Fifth Embodiment)

In Fifth Embodiment, the system uses the first take-up unit 60 and the downstream-side film supply unit 95 according to Second Embodiment to feed the first carrier film 12 (the first optical film laminate 11). The carrier film feed velocity (Vs(t)) is controlled using both the first take-up unit 60 and the downstream-side film supply unit 95.

(Other Embodiments)

In the above embodiments, the optical film laminate is drawn from the continuous roll and cut at predetermined intervals (by half cutting). In the invention, this feature is non-limiting. Alternatively, for example, the optical film laminate drawn from the continuous roll may be inspected for defects and cut in such a manner that defects are avoided based on the result of the inspection (by what is called skip cutting). Alternatively, defect information previously attached to the optical film laminate may be read out, and the optical film laminate may be cut in such a manner that defects are avoided based on the defect information. The defect information may include markings to indicate the defect positions.

The first and second polarizing films in the first and second continuous rolls may also have previously undergone cutting. Specifically, the first and second continuous rolls to be used may be what are called scored continuous rolls. In this case, the first and second cutting units are unnecessary, so that the tact time can be reduced.

EXAMPLES

Figure 4A:
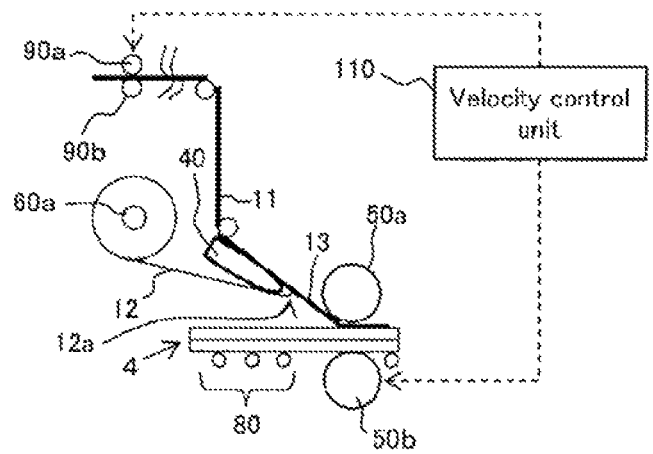
FIG. 4A is a schematic diagram showing an example of the velocity control unit according to First Embodiment.
Figure 4B:
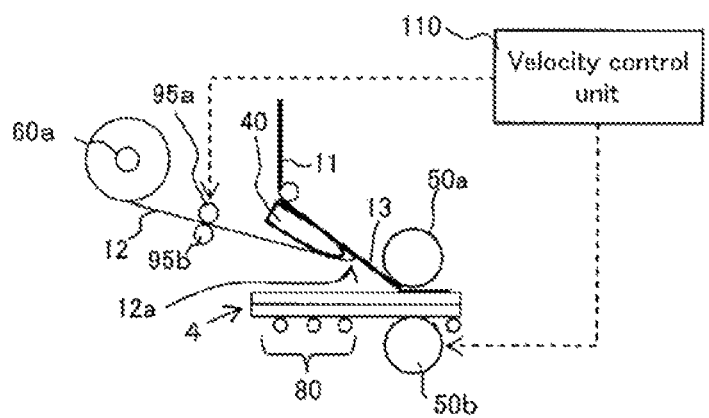
FIG. 4B is a schematic diagram showing an example of the velocity control unit according to Second Embodiment.
Figure 5:
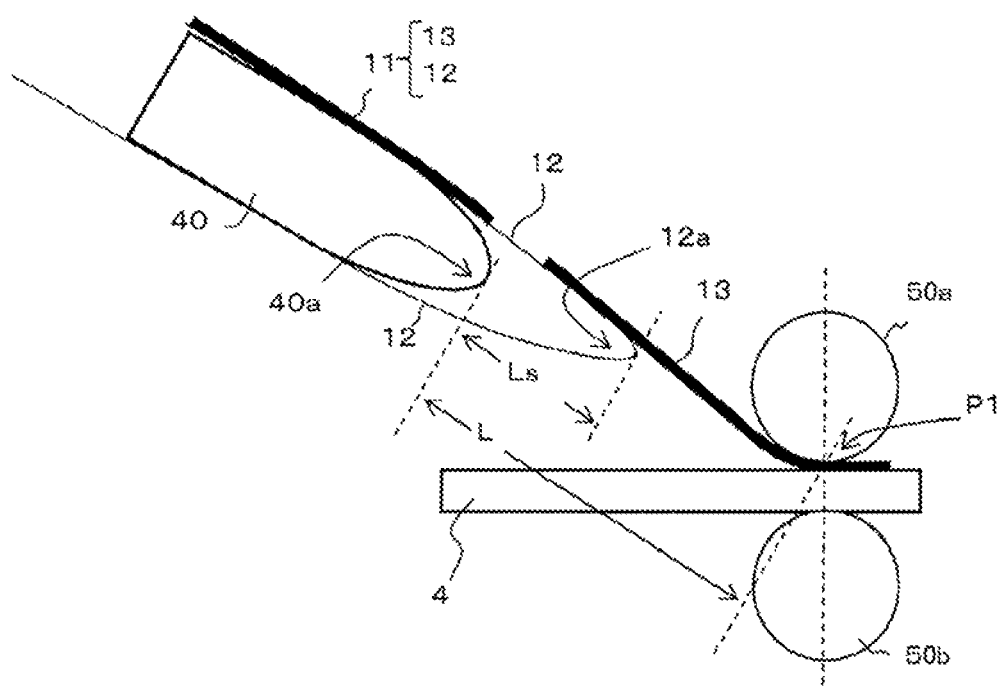
FIG. 5 is a schematic diagram showing an example of the peeling unit and an example of the bonding unit.

In the continuous manufacturing system shown in FIGS. 3 and 4A, sheet pieces of polarizing film (VEG1724DU manufactured by NITTO DENKO CORPORATION, 400 mm×700 mm) were bonded to non-alkali glass optical cells (manufactured by Corning Incorporated, 405 mm×710 mm) from the long side of the cells, respectively. In the example and the comparative examples, the bonding velocity Vh(t) and the carrier film feed velocity (the carrier film feed velocity of the upstream-side film supply unit) Vs(t) were each set as described below when the bonding was performed.

Figure 6A:
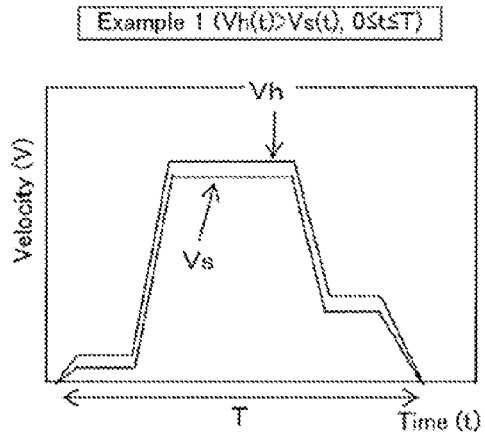
FIG. 6A is a diagram showing the velocity conditions in Example 1.

In Example 1, Vh(t)>Vs(t) was satisfied in the entire region being subjected to the bonding (Vh(t)>Vs(t) in the range 0≤t≤T). T represents the time (period) from the start of the bonding to the end of the bonding (hereinafter, the same applies). The velocity conditions in Example 1 are shown in FIG. 6A.

Figure 6B:
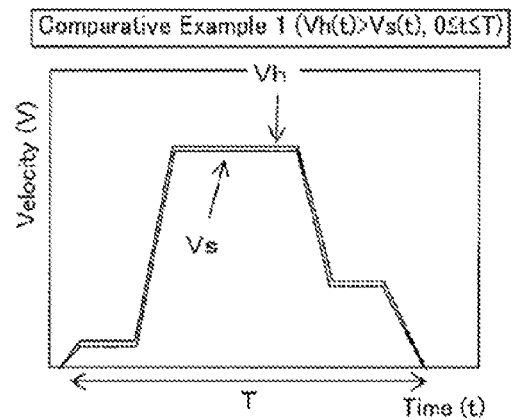
FIG. 6B is a diagram showing the velocity conditions in Comparative Example 1.

Comparative Example 1 was performed under the conditions: Vh(t)>Vs(t) was satisfied in the entire region being subjected to the bonding, but the difference between Vh(t) and Vs(t) was small so that slack in the sheet piece of polarizing film was not eliminated by the end of the bonding. The velocity conditions in Comparative Example 1 are shown in FIG. 6B.

Figure 6C:
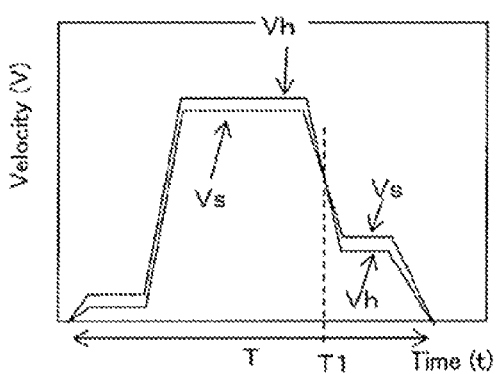
FIG. 6C is a diagram showing the velocity conditions in Comparative Example 2.

Comparative Example 2 was performed under the conditions: Vh(t)≤Vs(t) was satisfied in a certain region being subjected to the bonding, and in the other region, the difference between Vh(t) and Vs(t) (Vh(t)>Vs(t)) was small so that slack in the sheet piece of polarizing film was not eliminated by the end of the bonding (Vh(t)>Vs(t) in the range 0<t<T, Vh(t)≤Vs(t) where 0<t<T was not satisfied). The velocity conditions in Comparative Example 2 are shown in FIG. 6C.

Figure 6D:
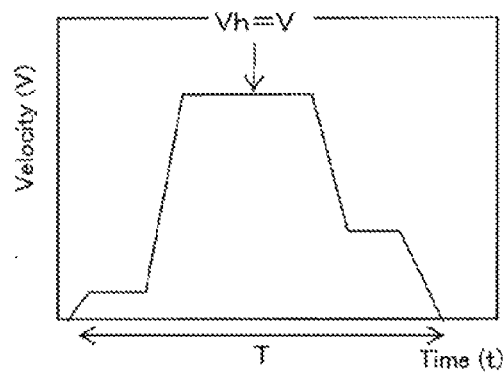
FIG. 6D is a diagram showing the velocity conditions in Comparative Example 3.

In Comparative Example 3, Vh(t)=Vs(t) was satisfied in the entire region being subjected to the bonding (Vh(t)=Vs(t) in the range 0≤t≤T). The velocity conditions in Comparative Example 3 are shown in FIG. 6D.

Figure 6E:
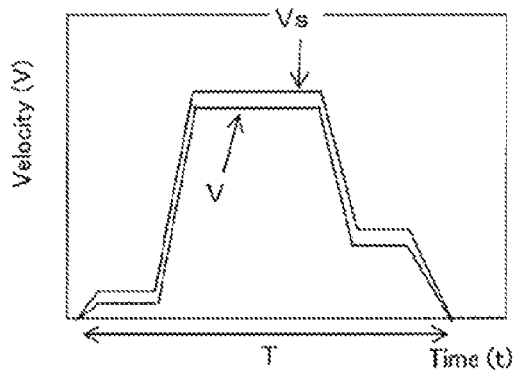
FIG. 6E is a diagram showing the velocity conditions in Comparative Example 4.

In Comparative Example 4, Vh(t)<Vs(t) was satisfied in the entire region being subjected the bonding (Vh(t)<Vs(t) in the range 0≤t≤T). The velocity conditions in Comparative Example 4 are shown in FIG. 6E.

Figure 6F:
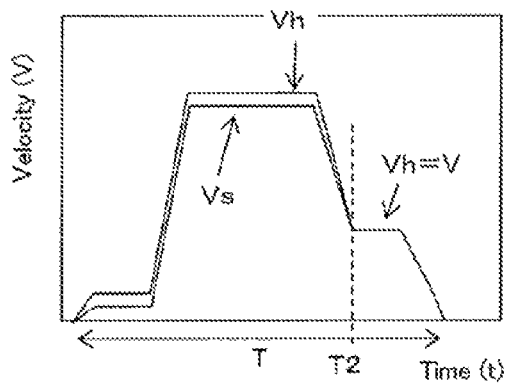
FIG. 6F is a diagram showing the velocity conditions in Comparative Example 5.
Figure 7:
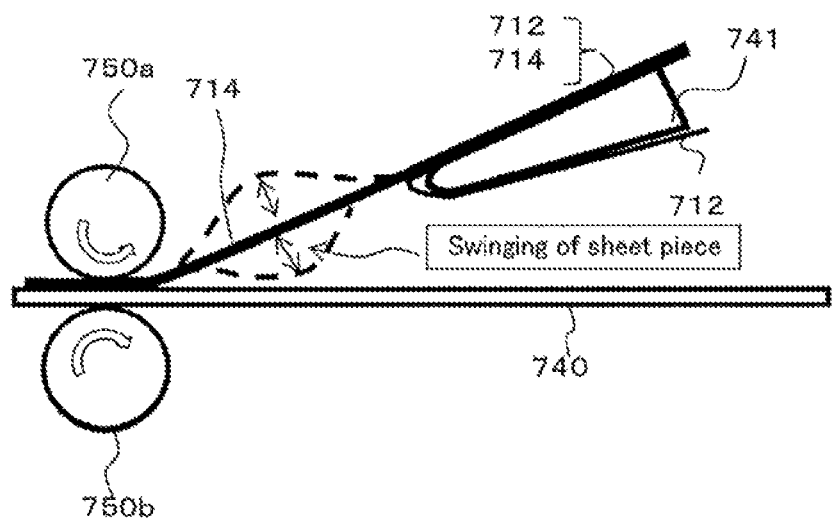
FIG. 7 is a diagram showing an example where a sheet piece of polarizing film is swinging when bonded using a conventional bonding unit.

Comparative Example 5 was performed under the conditions: Vh(t)>Vs(t) was satisfied in a certain region being subjected to the bonding, Vh(t)=Vs(t) was satisfied in the other region, and slack in the sheet piece of polarizing film was not eliminated by the end of the bonding (Vh(t)>Vs(t) in the range 0<t<T2, Vh(t)=Vs(t) where 0<t<T2 was not satisfied). The velocity conditions in Comparative Example 5 are shown in FIG. 6F.

(Evaluation Method)

(1) At the end of the bonding, the presence or absence of slack in the polarizing film and the presence or absence of swinging of the polarizing film were evaluated by visual inspection.

(2) After the bonding, the presence or absence of bubbles between the sheet piece of polarizing film and the optical cell was evaluated by visual inspection, and the rate of occurrence of bubbles was calculated.

(3) After the bonding, the presence or absence of retardation unevenness was evaluated by visual inspection, and the rate of occurrence of retardation unevenness was calculated. In each evaluation process, the sample number (N) was 100. The results of the evaluation are shown in Table 1.

TABLE 1

| | Velocity at start of bonding [mm/second] | | Maximum velocity during bonding [mm/second] | | Velocity at end of bonding [mm/second] | | Presence or absence of slack or swinging | Rate (%) of occurrence of bubbles | Rate (%) of occurrence of retardation unevenness | Yield (%) |
|---|---|---|---|---|---|---|---|---|---|---|
| | Vh | Vs | Vh | Vs | Vh | Vs | | | | |
| Example 1 | 41.7 | 11.7 | 416.7 | 386.7 | 166.7 | 136.7 | Absent | 0 | 0 | 100 |
| Comparative Example 1 | 41.7 | 25 | 416.7 | 400 | 166.7 | 150.0 | Present | 14 | 0 | 86 |
| Comparative Example 2 | 41.7 | 11.7 | 416.7 | 386.7 | 100 | 136.7 | Present | 32 | 0 | 68 |
| Comparative Example 3 | 41.7 | 41.7 | 416.7 | 416.7 | 166.7 | 166.7 | Present | 51 | 45 | 4 |
| Comparative Example 4 | 11.7 | 41.7 | 386.7 | 416.7 | 136.7 | 166.7 | Present | 78 | 0 | 22 |
| Comparative Example 5 | 41.7 | 11.7 | 416.7 | 386.7 | 136.7 | 136.7 | Present | 23 | 14 | 63 |

The results in Table 1 show that under the conditions of Example 1, slack in the sheet piece or swinging of the sheet piece was successfully eliminated, so that the occurrence of defects such as bubbles and retardation unevenness was successfully prevented. In contrast, under the conditions of any one of Comparative Examples 1 to 5, slack or swinging occurred in the sheet piece so that bubble defects occurred, and under the conditions of Comparative Example 3 or 5, retardation unevenness defects also occurred. The same results were obtained when the downstream-side film supply unit 95 was used in place of the upstream-side film supply unit 90 in controlling the carrier film feed velocity in the same manner as in the example or the comparative examples.

What is claimed is:

1. A method for continuously manufacturing an optical display panel, comprising:
   a carrier film feeding step comprising feeding a carrier film by means of a carrier film feeding unit, wherein sheet pieces of polarizing film are formed on the carrier film with a pressure-sensitive adhesive interposed therebetween;
   a peeling step comprising peeling off by means of a peeling unit a sheet piece of the polarizing film together with the pressure-sensitive adhesive from the carrier film by inwardly folding back the carrier film at a front end, wherein the carrier film is fed by the carrier film feeding step;
   a take-up step comprising taking up by means of a take-up unit the carrier film from which the sheet piece is peeled off by the peeling step;
   a bonding step comprising bonding the sheet piece by means of a bonding unit to an optical cell with the pressure-sensitive adhesive interposed therebetween while feeding the optical cell so that an optical display panel is formed, wherein the sheet piece is peeled off from the carrier film by the peeling step; and
   a velocity control step comprising: setting a bonding velocity and a carrier film feed velocity in such a manner that during an entire period from the start of the bonding of the sheet piece to the end of the bonding in the bonding step, the bonding velocity in the bonding step is higher than the carrier film feed velocity at which the carrier film being peeled off in the peeling step is fed by the carrier film feeding unit and in such a manner that slack formed in the sheet piece is eliminated between the bonding position and a front end of the peeling unit; and performing control in such a manner that during a period from the start of the bonding to the end of the bonding, the distance (L) between the bonding position and the front end of the peeling unit is longer than the distance (Ls) between the front end of the peeling unit and a bent part at which the carrier film is folded back, while the bonding velocity in the bonding step is higher than a velocity at which the carrier film is fed by the carrier film feeding unit,
   wherein the carrier film feeding unit has an upstream-side film supply unit for feeding the carrier film placed upstream of the peeling unit with respect to the feeding or has a downstream-side film supply unit for feeding the carrier film placed downstream of the peeling unit with respect to the feeding, and
   in the velocity control step, the upstream-side film supply unit or the downstream-side film supply unit is driven and controlled to feed the carrier film.

2. The method according to claim 1, wherein the upstream-side film supply unit comprises feed rollers, or the downstream-side film supply unit comprises feed rollers.

3. A system for continuously manufacturing an optical display panel, comprising:
   a carrier film feeding unit for feeding a carrier film on which sheet pieces of polarizing film are formed with a pressure-sensitive adhesive interposed therebetween;
   a peeling unit for peeling off a sheet piece of the polarizing film together with the pressure-sensitive adhesive from the carrier film by inwardly folding back the carrier film at its front end, wherein the carrier film is fed by the carrier film feeding unit;
   a take-up unit for taking up the carrier film from which the sheet piece is peeled off by the peeling unit;
   a bonding unit for bonding the sheet piece, which is peeled off from the carrier film by the peeling unit, to an optical cell with the pressure-sensitive adhesive interposed therebetween while feeding the optical cell so that an optical display panel is formed; and
   a velocity control unit for setting a bonding velocity and a carrier film feed velocity in such a manner that during an entire period from the start of the process of bonding the sheet piece by means of the bonding unit to the end of the bonding, the bonding velocity in the bonding process is higher than the carrier film feed velocity at which the carrier film being peeled off by the peeling unit is fed by the carrier film feeding unit and in such a manner that slack formed in the sheet piece being subjected to the bonding is eliminated between the front end of the peeling unit and a position in which the bonding is performed by the bonding unit,
   the velocity control unit being also for performing control in such a manner that during a period from the start of the bonding process to the end of the bonding, the distance (L) between the front end of the peeling unit and the position in which the bonding is performed by the bonding unit is longer than the distance (Ls) between the front end of the peeling unit and a bent part at which the carrier film is folded back, while the bonding velocity of the bonding unit is higher than a velocity at which the carrier film is fed by the carrier film feeding unit, wherein the carrier film feeding unit has an upstream-side film supply unit for feeding the carrier film placed upstream of the peeling unit with respect to the feeding or has a downstream-side film supply unit for feeding the carrier film placed downstream of the peeling unit with respect to the feeding, and the velocity control unit drives and controls the upstream-side film supply unit or the downstream-side film supply unit to feed the carrier film.

4. The system according to claim 3, wherein the upstream-side film supply unit comprises feed rollers, or the downstream-side film supply unit comprises feed rollers.

* * * * *